(12) United States Patent
Cantelar

(10) Patent No.: US 11,846,428 B1
(45) Date of Patent: Dec. 19, 2023

(54) SELF-LOCKING TELESCOPIC FIRE PIT

(71) Applicant: Eduardo M Cantelar, Miami, FL (US)

(72) Inventor: Eduardo M Cantelar, Miami, FL (US)

( * ) Notice: Subject to any disclaimer, the term of this patent is extended or adjusted under 35 U.S.C. 154(b) by 0 days.

(21) Appl. No.: 18/469,525

(22) Filed: Sep. 18, 2023

(51) Int. Cl.
*F24B 3/00* (2006.01)
*A47J 37/07* (2006.01)

(52) U.S. Cl.
CPC ............... *F24B 3/00* (2013.01); *A47J 37/07* (2013.01); *A47J 2037/0777* (2013.01)

(58) Field of Classification Search
CPC ....... F24B 3/00; A47J 37/07; A47J 2037/0777
See application file for complete search history.

(56) References Cited

U.S. PATENT DOCUMENTS

| | | | | |
|---|---|---|---|---|
| 28,597 | A * | 6/1860 | Niles | B65D 21/086 220/8 |
| 968,925 | A * | 8/1910 | Ferguson | B65D 21/086 220/8 |
| 2,893,167 | A * | 7/1959 | Davidson | A01G 9/02 220/8 |
| 4,014,315 | A * | 3/1977 | Lagunilla | F24C 1/16 220/8 |
| 10,598,384 | B2 * | 3/2020 | Cuffaro | A47J 37/0763 |
| 2010/0308042 | A1 * | 12/2010 | Faris | B65D 21/08 220/8 |
| 2011/0248037 | A1 * | 10/2011 | Fung | B65D 21/086 220/592.2 |
| 2014/0238378 | A1 * | 8/2014 | Scott | F24B 1/181 126/55 |
| 2015/0291309 | A1 * | 10/2015 | McGregor | B65D 21/086 220/573.1 |
| 2020/0015626 | A1 * | 1/2020 | Corso | A47J 37/0704 |
| 2020/0146505 | A1 * | 5/2020 | Bell | A47J 37/0623 |
| 2021/0018180 | A1 * | 1/2021 | Jan | F24B 1/192 |
| 2021/0048188 | A1 * | 2/2021 | Harrington | F24B 13/006 |
| 2021/0285648 | A1 * | 9/2021 | Kim | F24B 1/205 |
| 2022/0252270 | A1 * | 8/2022 | Weilert | F24B 13/006 |
| 2023/0044096 | A1 * | 2/2023 | Koehler | F24C 3/022 |

FOREIGN PATENT DOCUMENTS

| | | | |
|---|---|---|---|
| DE | 1017762 B | * | 10/1957 |
| DE | 2843394 A1 | * | 4/1980 |
| FR | 481819 A | * | 1/1917 |
| KR | 200495849 Y1 | * | 8/2022 |
| RU | 2646645 C1 | * | 3/2018 |

* cited by examiner

*Primary Examiner* — Michael G Hoang
*Assistant Examiner* — Logan P Jones
(74) *Attorney, Agent, or Firm* — Ruben Alcora, Esq.

(57) ABSTRACT

A self-locking telescopic fire pit that is easily transportable. The self-locking collapsible fire pit is self-locking. The self-locking telescopic fire pit is collapsible. The self-locking telescopic fire pit comprises of a double walled base section, a middle double walled section that telescopically mounts on the double walled base section, and an upper double walled section that telescopically mounts on the middle double walled section. All sections define a cavity wherein air flows through. All sections define locking means that allow the self-locking telescopic fire pit to be locked in either an extended or in a retracted position.

9 Claims, 2 Drawing Sheets

SELF-LOCKING TELESCOPIC FIRE PIT

TECHNICAL FIELD

The present invention pertains to a self-locking telescopic fire pit.

BACKGROUND

The inventor of the present invention is an avid outdoorsman who loves taking cross country trips in his vehicle.

One of the biggest problems that he has suffered in his trips is having to set up a grill and break up a grill to nourish himself, and then to stow the grill after it use. Usually when stowing the grill, either himself or his vehicle get filthy during the process.

Another problem that he suffers on his road trips is that when he takes a grill, the grill is an unstable structure that tends to fall over in his vehicle.

Yet another problem he experiences when camping is freezing temperatures when he hikes away from his vehicle. Often, he is forced to dig holes in the ground to create fire pits in desolate areas to warm himself.

Because of the recited problems, the inventor conceived the present invention, a lightweight, self-locking telescopic fire pit, that could also work as an outdoor cooking grill that is easy to transport.

The present invention is designed, when collapsed, to be easily attachable to a backpack. It is also designed, when it is collapsed, to be placed flat on a vehicle structure.

SUMMARY

The present invention is directed to a self-locking telescopic fire pit that is easy to transport.

The self-locking telescopic fire pit comprises of a double walled base section, a middle double walled section that telescopically mounts on the double walled base section, and an upper double walled section that telescopically mounts on the middle double walled section. All sections define a cavity wherein air flows through. All sections define locking means that allow the self-locking telescopic fire pit to be locked in either an extended or in a retracted position.

The double walls of the present invention allow air to flow inward from the bottom and the top of the self-locking telescopic fire pit. The air intake allows the present invention to provide a clean burn.

An object of the present invention is to provide a collapsible travel pit that can easily be stored in a vehicle.

Another object of the present invention is to provide a collapsible fire pit that can be used as an emergency stove.

Yet another object of the present invention is to provide a collapsible fire pit that is easy to stow in a backpack.

Yet still another object of the present invention is to provide a tactical collapsible fire pit that can be used by military personnel when on clandestine missions.

A further object of the present invention is to provide a collapsible fire pit that can be laid flat in a transport vehicle and that will not flip while in transport.

Yet a further object of the present invention is to provide a collapsible fire pit that will prevent animals from getting injured if they inadvertently touch the outer walls of the pit when the pit is burning a combustible material.

Yet still a further object of the present invention is to provide a camper with a fire pit that can easily be transported and stowed after use that will not dirty the transport vehicle.

Still another object of the present invention is to provide a self-locking fire pit.

Yet still another object of the present invention is to provide a fire pit that provides a clean burn.

DRAWINGS

These and other features, aspects, and advantages of the present invention will become better understood with regards to the following description, appended claims, and drawings where:

DESCRIPTION

Figure 1:
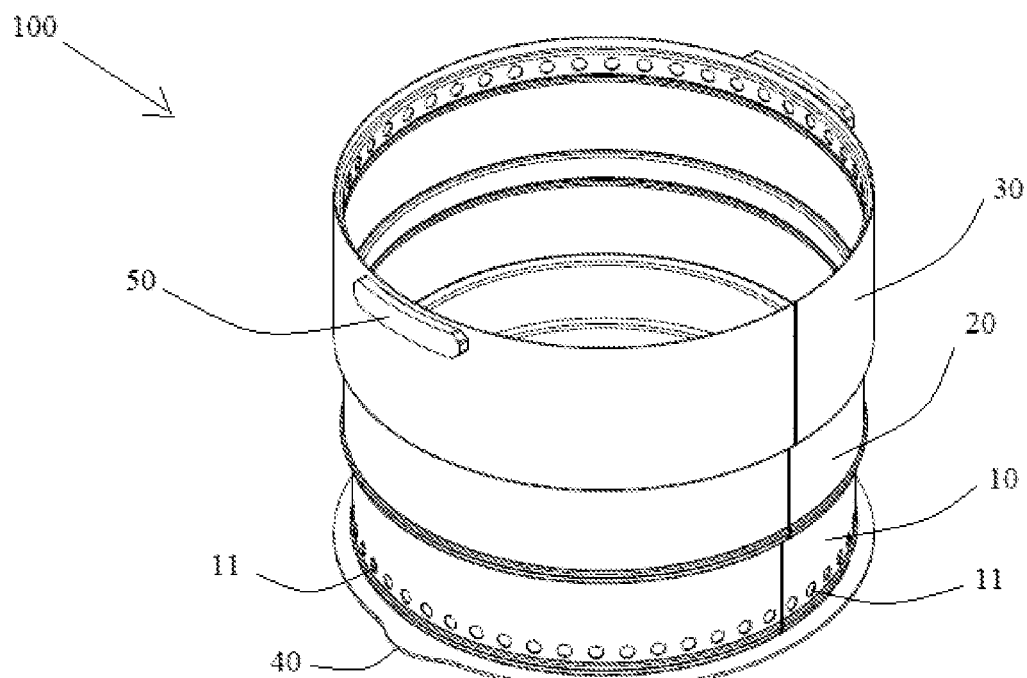
FIG. 1 is a perspective view of the present invention in an extended position.
Figure 2:
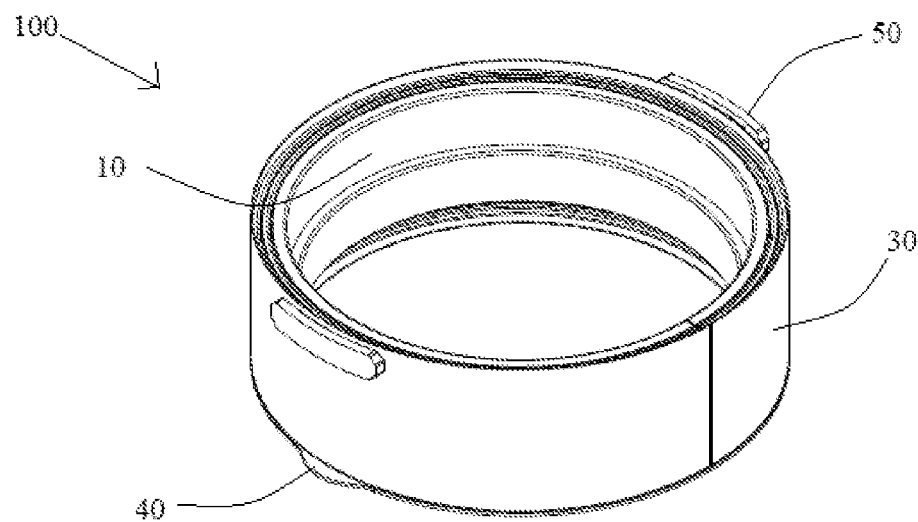
FIG. 2 is a perspective view of the present invention in a retracted position.
Figure 3:
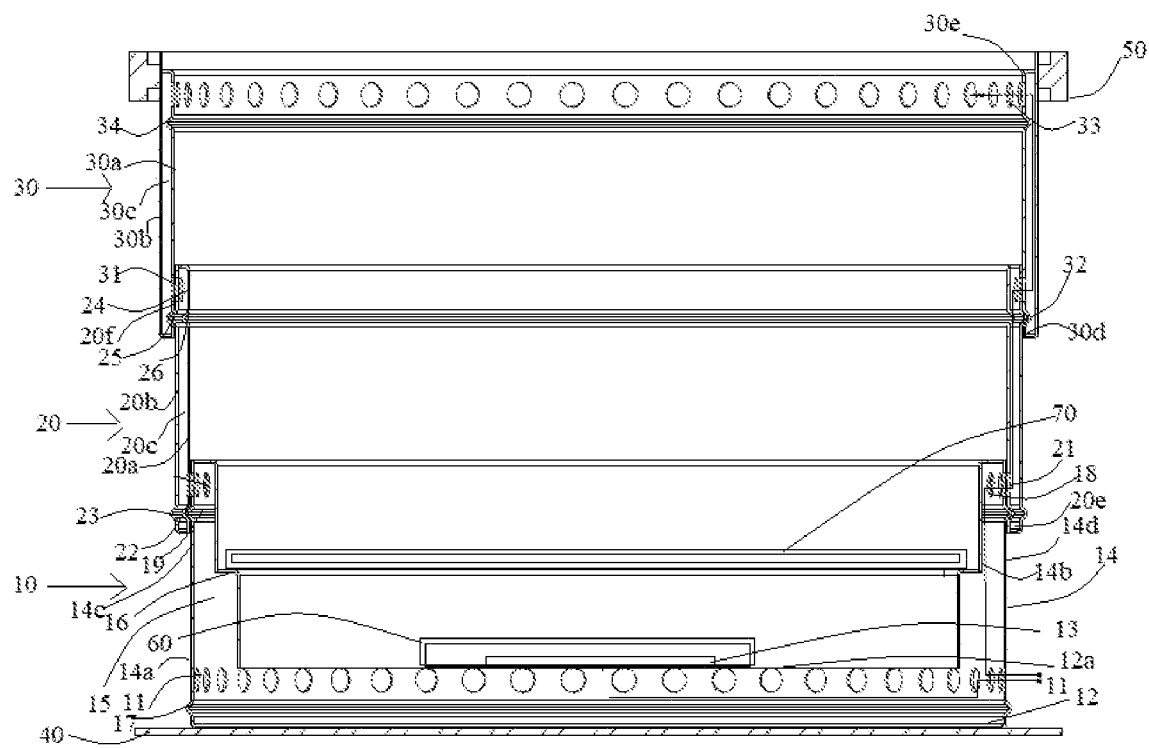
FIG. 3 is a cross-sectional view of the present invention.

As seen in FIGS. 1-3, the present invention is a self-locking telescopic fire pit.

The self-locking telescopic fire pit 100 comprises a double walled base section 10 that has a double walled base 12 and a double walled perimeter wall 14 that extends upward from the double walled base 12, the double walled base 12 defines a central base air outlet aperture 13 that is centrally positioned on an upper wall 12a of the double walled base 12 and a plurality of air intake apertures 11 are defined on a lower outward side 14a of the double walled perimeter wall 14, the doubled walled base 12 and the double walled perimeter wall 14 define a cavity 15 between the walls that allow air to flow between the walls, a ledge 16 extends inward from an inner wall 14b of the double walled perimeter wall 14, the ledge 16 is at least two inches above the double walled base 12, a first continuous ridge 17 extends outward from the outer wall 14d of the double walled perimeter wall 14, the first continuous ridge 17 is positioned below the plurality of air intake apertures 11, a second continuous ridge 19 extends outward from an upper section 14c of the outer wall 14d of the double walled perimeter wall 14, and a plurality of air outlet apertures 18 are defined on the outer wall 14d of the double walled perimeter wall 14 at a position that is above the second continuous ridge 19. A middle double walled section 20 that telescopically mounts on the double walled base section 10, a middle cavity 20c is defined between an inner wall 20a and an outer wall 20b of the middle double walled section 20, a plurality of air intake apertures 21 are defined on a lower section 20e of the inner wall 20c, a continuous lower groove 22 is defined on the inner wall 20a at a position that is below the plurality of air intake apertures 21, a continuous lower ridge 23 is defined on the outer wall 20b at a position that is aligned with the continuous lower groove 22, a plurality of air outlet apertures 24 are defined at an upper section 20f of the outer wall 20b, a continuous upper ridge 25 is defined on the outer wall 20b, the continuous upper ridge 25 is positioned below the plurality of air outlet apertures 24, and a continuous upper groove 26 is defined on the inner wall 20a of the middle double walled section 20 at a position that is aligned with the continuous upper ridge 25. And, an upper double walled section 30 that telescopically mounts on the middle double walled section 20, an upper cavity 30c is defined between an inner wall 30a and an outer wall 30b of the upper double walled section 30, a plurality of air intake apertures 31 are defined on a lower section 30d of the inner wall 30a, a continuous lower groove 32 is defined on the inner wall 30a at a position that is below the plurality of air intake apertures 31, a plurality of air outlet apertures 33 are defined at an upper section 30e of the inner wall 30a, and a continuous upper groove 34 is defined on the inner wall 30c, the continuous upper groove 34 is positioned below the plurality of air outlet apertures 33.

In all embodiments of the present invention, the plurality of air outlet apertures of the double walled base section align with the plurality of air inlet apertures of the middle double walled section when the self-locking telescopic fire pit is extended, and the plurality of air outlet apertures of the middle double walled section align with the plurality of intake apertures of the upper double walled section when the self-locking fire pit is extended.

In preferred embodiments of the present invention, the self-locking telescopic fire pit further comprises of a pan 60 that is placed above the central base air outlet aperture 13, and of a grate 70 that is placed on the ledge 16. The ledge 16 can be a continuous ledge 16.

In preferred embodiments, the self-locking telescopic fire pit further comprises of a pair of foot rests 40 that are attached to the double walled base 12, each foot rest 40 of the pair of foot rests 12 is extends outward from the double walled base 12 and the pair of foot rests 40 are aligned.

In preferred embodiments of the present invention, the self-locking telescopic fire pit further comprises of a pair of handles 50 that are attached to the upper double walled section each handle 50 of the pair of handles 50 extends outwards from the upper double walled section 30 and the pair of handles 50 are aligned.

In an embodiment of the present invention, the diameter of the double walled base is nineteen inches, the height of the self-locking telescopic fire pit, when extended, is fourteen inches. In this embodiment, the height, when the self-locking telescopic fire pit is collapsed, is six inches.

An advantage of the present invention is that it provides a collapsible travel pit that is easily be stored in a vehicle.

Another advantage of the present invention is that it provides a collapsible fire pit that serves as an emergency stove.

Yet another advantage of the present invention is that it provides a collapsible fire pit that stows in a backpack.

Yet still another advantage of the present invention is that it provides a tactical collapsible fire pit that military personnel can use when on clandestine missions.

A further advantage of the present invention is that it provides a collapsible fire pit that lays flat in a transport vehicle and that does not flip while in transport.

Yet a further advantage of the present invention is that it provides a collapsible fire pit that prevents animals from getting injured when they inadvertently touch the outer walls of the pit.

Yet still a further advantage of the present invention is that it allows a camper to have a fire pit that he can easily transport and stow after use that will not soil his transport vehicle.

Still another advantage of the present invention is that it provides a self-locking fire pit.

Yet still another advantage of the present invention is that it provides a fire pit that provides a clean burn.

The embodiments of the collapsible fire pit described herein are exemplary and numerous modifications, combinations, variations, and rearrangements can be readily envisioned to achieve an equivalent result, all of which are intended to be embraced within the scope of the appended claims. Further, nothing in the above-provided discussions of the collapsible fire pit should be construed as limiting the invention to an embodiment or a combination of embodiments. The scope of the invention is defined by the description, drawings, and claims.

What is claimed is:

1. A self-locking telescopic fire pit, the self-locking telescopic fire pit comprises:
    a double walled base section that has a double walled base and a double walled perimeter wall that extends upward from the double walled base, the double walled base defines a central base air outlet aperture that is centrally positioned on an upper wall of the double walled base and a plurality of air intake apertures are defined on a lower outward side of the double walled perimeter wall, the doubled walled base and the double walled perimeter wall define a cavity between the walls that allow air to flow between the walls, a ledge extends inward from an inner wall of the double walled perimeter wall, a first continuous ridge extends outward from the outer wall of the double walled perimeter wall, the first continuous ridge is positioned below the plurality of air intake apertures, a second continuous ridge extends outward from an upper section of the outer wall of the double walled perimeter wall, and a plurality of air outlet apertures are defined on the outer wall of the double walled perimeter wall at a position that is above the second continuous ridge;
    a middle double walled section that telescopically mounts on the double walled base section, a middle cavity is defined between an inner wall and an outer wall of the middle double walled section, a plurality of air intake apertures are defined on a lower section of the inner wall, a continuous lower groove is defined on the inner wall at a position that is below the plurality of air intake apertures, a continuous lower ridge is defined on the outer wall at a position that is aligned with the continuous lower groove, a plurality of air outlet apertures are defined at an upper section of the outer wall, a continuous upper ridge is defined on the outer wall, the continuous upper ridge is positioned below the plurality of air outlet apertures, and a continuous upper groove is defined on the inner wall of the middle double walled section at a position that is aligned with the continuous upper ridge; and
    an upper double walled section that telescopically mounts on the middle double walled section, an upper cavity is defined between an inner wall and an outer wall of the upper double walled section, a plurality of air intake apertures are defined on a lower section of the inner wall, a continuous lower groove is defined on the inner wall at a position that is below the plurality of air intake apertures, a plurality of air outlet apertures are defined at an upper section of the inner wall, and a continuous upper groove is defined on the inner wall, the continuous upper groove is positioned below the plurality of air outlet apertures.

2. The self-locking telescopic fire pit of claim 1, wherein the plurality of air outlet apertures of the double walled base section align with the plurality of air inlet apertures of the middle double walled section when the self-locking telescopic fire pit is extended, and wherein the plurality of air outlet apertures of the middle double walled section align with the plurality of intake apertures of the upper double walled section when the self-locking fire pit is extended.

3. The self-locking telescopic fire pit of claim 2, the self-locking telescopic fire pit comprises:
    a pan that is placed above the central base air outlet aperture; and
    a grate that is placed on the ledge.

4. The self-locking telescopic fire pit of claim 3, wherein the ledge is continuous.

5. The self-locking telescopic fire pit of claim 2, the self-locking telescopic fire pit comprises a pair of foot rests that are attached to the double walled base, each foot rest of the pair of foot rests is extends outward from the double walled base and the pair of foot rests are aligned.

6. The self-locking telescopic fire pit of claim 5, the self-locking telescopic fire pit comprises a pair of handles that are attached to the upper double walled section, each handle of the pair of handles extends outwards from the upper double walled section and the pair of handles are aligned.

7. The self-locking telescopic fire pit of claim 1, the self-locking telescopic fire pit comprises a pair of foot rests that are attached to the double walled base, each foot rest of the pair of foot rests is extends outward from the double walled base and the pair of foot rests are aligned.

8. The self-locking telescopic fire pit of claim 2, the self-locking telescopic fire pit comprises a pair of handles that are attached to the upper double walled section, each handle of the pair of handles extends outwards from the upper double walled section and the pair of handles are aligned.

9. The self-locking telescopic fire pit of claim 1, wherein the ledge is at least two inches above the double walled base.

\* \* \* \* \*